US012811242B2

(12) United States Patent
Lim

(10) Patent No.: US 12,811,242 B2
(45) Date of Patent: Nov. 24, 2026

(54) FLAME BLOCKING UNIT AND BATTERY PACK

(71) Applicant: SK On Co., Ltd., Seoul (KR)

(72) Inventor: Ji Hoon Lim, Daejeon (KR)

(73) Assignee: SK ON CO., LTD., Seoul (KR)

( * ) Notice: Subject to any disclaimer, the term of this patent is extended or adjusted under 35 U.S.C. 154(b) by 578 days.

(21) Appl. No.: 18/073,047

(22) Filed: Dec. 1, 2022

(65) Prior Publication Data

US 2023/0178845 A1 Jun. 8, 2023

(30) Foreign Application Priority Data

Dec. 3, 2021 (KR) ........................ 10-2021-0172178

(51) Int. Cl.
*H01M 50/383* (2021.01)
*H01M 10/658* (2014.01)
(Continued)

(52) U.S. Cl.
CPC ....... *H01M 50/383* (2021.01); *H01M 10/658* (2015.04); *H01M 50/242* (2021.01); *H01M 50/3425* (2021.01); *H01M 2200/20* (2013.01)

(58) Field of Classification Search
CPC ............. H01M 50/383; H01M 10/658; H01M 50/242; H01M 50/3425; H01M 2200/20
See application file for complete search history.

(56) References Cited

U.S. PATENT DOCUMENTS 3,915,753 A 10/1975 Melone
2005/0170238 A1* 8/2005 Abu-Isa ............... H01M 50/117 429/82
(Continued)

FOREIGN PATENT DOCUMENTS

CN 102738423 A 10/2012
CN 206864524 U 1/2018
(Continued)

OTHER PUBLICATIONS

Extended European Search Report for Application No. 22211146.0 issued by the EPO on Apr. 28, 2023.
(Continued)

*Primary Examiner* — Nicole M. Buie-Hatcher
*Assistant Examiner* — Taylor Harrison Krone
(74) *Attorney, Agent, or Firm* — IP & T GROUP LLP

(57) ABSTRACT

Proposed is a battery pack. The battery pack includes a battery module in which an internal terminal is exposed at an opening part, and a flame blocking unit which is connected to the internal terminal via the opening part and which transmits electric power of the internal terminal to the outside, the flame blocking unit covering the opening part so that a flame generated inside the battery module is blocked from being emitted. The battery module may include a battery assembly including a plurality of battery cells, a busbar assembly including the internal terminal which is connected to the battery assembly and which transmits electric power, and a casing which accommodates the battery assembly and the busbar assembly therein and in which the opening part is formed. By this configuration, thermal runaway of the battery module may be blocked or delayed, so stability of the battery pack may be increased.

14 Claims, 10 Drawing Sheets

(51) Int. Cl.
*H01M 50/242* (2021.01)
*H01M 50/342* (2021.01)

(56) References Cited

U.S. PATENT DOCUMENTS

| | | | | |
|---|---|---|---|---|
| 2011/0183194 | A1* | 7/2011 | Lee | H01M 50/567 429/179 |
| 2012/0258338 | A1* | 10/2012 | Kim | H01M 50/3425 429/163 |
| 2012/0276427 | A1* | 11/2012 | Kim | H01M 50/533 429/90 |
| 2015/0221914 | A1 | 8/2015 | Page et al. | |
| 2021/0164511 | A1* | 6/2021 | Jeong | H01M 50/502 |
| 2021/0265705 | A1* | 8/2021 | Min | H01M 50/517 |
| 2021/0320374 | A1 | 10/2021 | Lee et al. | |
| 2022/0094003 | A1* | 3/2022 | Jo | H01M 50/507 |

FOREIGN PATENT DOCUMENTS

| | | | | | |
|---|---|---|---|---|---|
| CN | 212033104 | U | | 11/2020 | |
| CN | 112055897 | A | | 12/2020 | |
| CN | 112272897 | A | | 1/2021 | |
| CN | 212277326 | U | | 1/2021 | |
| EP | 2922073 | A1 | | 9/2015 | |
| EP | 3916833 | A1 | | 12/2021 | |
| JP | 2020098689 | A | * | 6/2020 | H01M 50/296 |
| KR | 10-1726110 | B1 | | 4/2017 | |
| KR | 10-2018-0114606 | A | | 10/2018 | |
| KR | 20180114606 | A | * | 10/2018 | H01M 2/1022 |
| KR | 10-2020-0067587 | A | | 6/2020 | |
| KR | 10-2262745 | B1 | | 6/2021 | |
| KR | 10-2021-0112645 | A | | 9/2021 | |

OTHER PUBLICATIONS

Office Action for Chinese Patent Application No. 202211539758.3 issued by the Chinese Patent Office on Aug. 28, 2026.

Office Action for European Patent Application No. 22211146.0 issued by the European Patent Office on Jun. 16, 2026.

* cited by examiner

FLAME BLOCKING UNIT AND BATTERY PACK

CROSS REFERENCE TO RELATED APPLICATION

The present application claims priority to Korean Patent Application No. 10-2021-0172178, filed Dec. 3, 2021, the entire contents of which is incorporated herein for all purposes by this reference.

BACKGROUND OF THE INVENTION

Field of the Invention

The present disclosure relates to a flame blocking unit and a battery pack including the flame blocking unit.

Description of the Related Art

Recently, from a light-weight portable device, such as a mobile phone, a notebook computer, or a camera, to an electric vehicle, a hybrid vehicle, or an Energy Storage System (ESS), demand for a secondary battery that is capable of being repeatedly charged and discharged is rapidly increasing.

Such a secondary battery may be formed as a battery module or a battery pack having a shape in which a plurality of battery cells is accommodated in a casing. At this time, due to various factors such as overcharging of battery cells, thermal runaway may occur in any one of the battery modules of the battery pack.

In the battery module in which the thermal runaway occurs, a flame may be emitted from an assembly gap of the battery module. By the emitted flame, thermal propagation that propagates heat to adjacent battery modules inside the battery pack may occur. When the thermal propagation occurs inside the battery pack, a safety risk such as explosion may occur.

Document of Related Art (Patent Document 1) KR 10-2021-0112645 A

SUMMARY OF THE INVENTION

An objective of an embodiment of the present disclosure is to provide a flame blocking unit that is for preventing a flame from being emitted from a terminal of a battery module.

In addition, an objective of an embodiment of the present disclosure is to provide a battery pack in which a flame is not emitted from the terminal when thermal runaway occurs.

A flame blocking unit according to an embodiment of the present disclosure may include an expansion terminal which is connected to an internal terminal of a battery module via an opening part that is formed in a casing of the battery module and which transmits electric power, and may include a blocking plate filling a gap between the expansion terminal and the opening part.

In addition, the blocking plate may be formed by performing an insert injection molding such that the blocking plate surrounds an outer circumferential surface of the expansion terminal, and may be formed of a high heat resistant material having a volume change within 25% when the high heat resistant material is exposed at a temperature equal to or more than 200° C. for 72 hours.

In addition, the blocking plate may be formed such that an area of the blocking plate is larger than an area of the opening part so that the blocking plate covers the opening part from an outside of the casing.

In addition, the blocking plate may include: a plate part formed such that an area of the plate part is larger than the area of the opening part so that the blocking plate covers the opening part from the outside of the casing; an expansion terminal accommodating part which is positioned at a center of the plate part and which is formed in a hole shape that accommodates the expansion terminal therein; and a fitting part which is formed on a surface where the plate part and the casing are in contact with each other and which protrudes such that the fitting part corresponds to an inner surface shape of the opening part.

In addition, the expansion terminal may be provided with a through-hole through which a fastener that connects the internal terminal to the expansion terminal passes.

In addition, the blocking plate may be in close contact with the opening part of the casing by a force that couples the fastener to the casing.

A battery pack according to an embodiment of the present disclosure may include: a battery module in which an internal terminal is exposed at an opening part; and a flame blocking unit which is connected to the internal terminal via the opening part and which transmits electric power of the internal terminal to an outside, the flame blocking unit covering the opening part so that a flame generated inside the battery module is prevented from being discharged, wherein the battery module may include: a battery assembly including a plurality of battery cells; a busbar assembly including the internal terminal which is connected to the battery assembly and which transmits electric power; and a casing which accommodates the battery assembly and the busbar assembly therein and in which the opening part is formed.

In addition, the flame blocking unit may include: an expansion terminal which is connected to the internal terminal via the opening part and which transmits electric power; and a blocking plate filling a gap between the expansion terminal and the opening part.

In addition, the blocking plate may be formed by performing an insert injection molding such that the blocking plate surrounds an outer circumferential surface of the expansion terminal, and may be formed of a high heat resistant material having a volume change within 25% when the high heat resistant material is exposed at a temperature equal to or more than 200° C. for 72 hours.

In addition, the blocking plate may be formed such that an area of the blocking plate is larger than an area of the opening part so that the blocking plate covers the opening part from an outside of the casing.

In addition, the blocking plate may include: a plate part formed such that an area of the plate part is larger than the area of the opening part so that the blocking plate covers the opening part from the outside of the casing; an expansion terminal accommodating part which is positioned at a center of the plate part and which is formed in a hole shape that accommodates the expansion terminal therein; and a fitting part which is formed on a surface where the plate part and the casing are in contact with each other and which protrudes such that the fitting part corresponds to an inner surface shape of the opening part.

In addition, the battery pack according to an embodiment of the present disclosure may further include a fastener which is coupled to the casing and which connects the internal terminal to the expansion terminal, wherein through-holes through which the fastener passes may be respectively formed in the internal terminal and the expansion terminal.

In addition, the fastener may be coupled to the casing by passing through the through-holes of the internal terminal and the expansion terminal, and the blocking plate may be in close contact with the opening part of the casing by a force that couples the fastener to the casing.

In addition, the battery pack according to an embodiment of the present disclosure may further include an external busbar which is connected to an external electrode and in which a through-hole where the fastener passes therethrough is formed, wherein the fastener may be coupled to the casing by passing through the through-holes of the external busbar, the internal terminal, and the expansion terminal.

In addition, the busbar assembly may further include: a tab bus into which cell tabs having the same polarity are inserted and which electrically connects the inserted cell tabs to each other; and an insulating member which is formed of an electrically insulative material and which supports and fixes the internal terminal and the tab bus, wherein the insulating member may be provided with a first partition wall which protrudes from a space between the tab bus and an adjacent tab bus and which vertically partitions the tab bus and the adjacent tab bus from each other.

In addition, the insulating member may further include a second partition wall which horizontally protrudes from a lower portion of the first partition wall.

In addition, the casing may include a front cover coupled to the casing from a first side of the battery assembly in a longitudinal direction, the battery module may further include an insulating part which is disposed between the front cover and the busbar assembly and which is formed of an electrically insulative material, and the first partition wall and the second partition wall may protrude such that the first partition wall and the second partition wall are in close contact with the insulating part.

In addition, the casing may include a top cover coupled to the casing from an upper portion of the casing such that the battery assembly is covered, and at least one venting hole may be formed in the top cover such that gas or a flame generated inside the battery module is vented to the outside through an upper portion of the battery module.

In addition, the top cover may further include a venting sheet coupled to a lower portion of the top cover such that a lower portion of the venting hole is covered, and the venting sheet may be provided with a venting line which is formed in a portion corresponding to the venting hole so that the portion corresponding to the venting hole bursts when a pressure of gas generated inside the battery module reaches a predetermined pressure.

The terms and words used in the present specification and claims should not be interpreted as being limited to typical meanings and dictionary definitions, but should be interpreted as having meanings and concepts relevant to the technical scope of the present disclosure based on the rule according to which an inventor can appropriately define the concept of the term to describe most appropriately the best method he or she knows for carrying out the present disclosure.

According to an embodiment of the present disclosure, a flame may be blocked or delayed from being emitted through the opening part through which the internal terminal is connected to the external busbar.

In addition, since the flame blocking unit is electrically connected to the internal terminal and electrically insulates the internal terminal from the casing, a short circuit may be prevented.

In addition, the fastener is coupled to the casing by passing through the through-hole that is formed in the expansion terminal, and the flame blocking unit is in close contact with the opening part by a force that is generated when the fastener is coupled to the casing, so that a flame blocking ability may be further increased.

According to an embodiment of the present disclosure, a flame generated inside the battery module is blocked or delayed from being emitted to a gap between the internal terminal and the opening part, so that safety of the battery pack may be increased.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Figure 1:
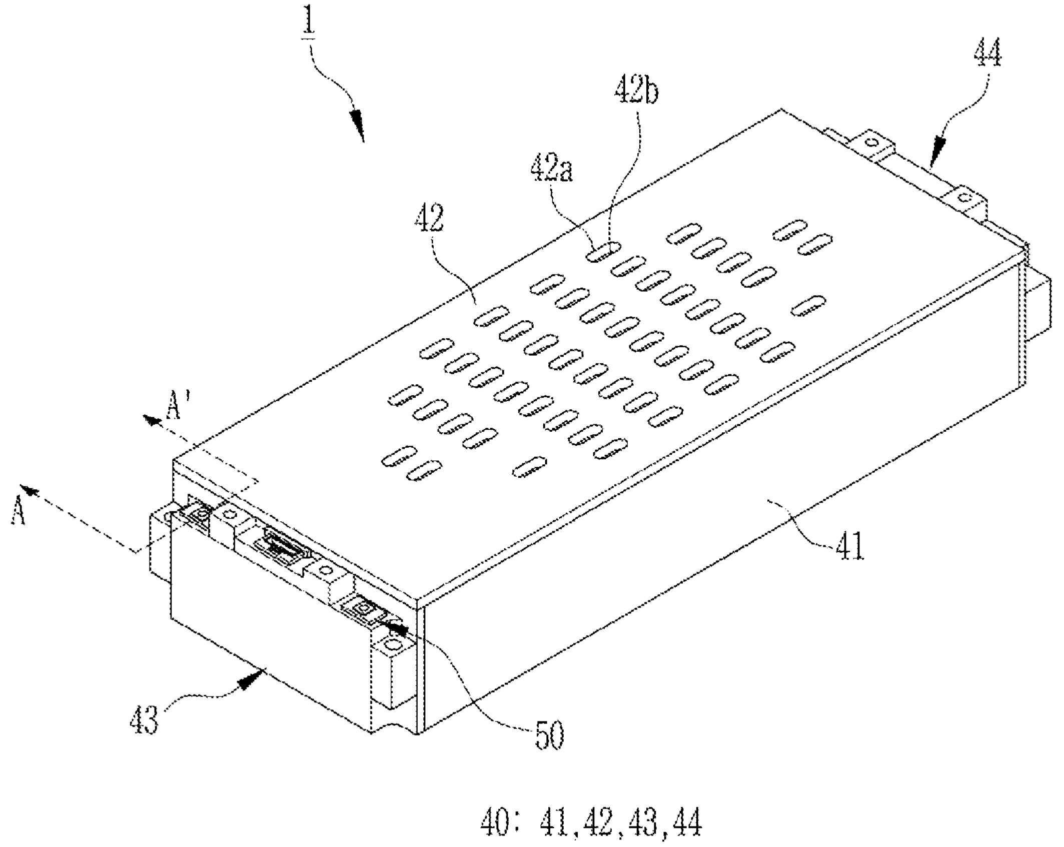
FIG. 1 is a perspective view illustrating a battery module according to an embodiment of the present disclosure.

The objectives, features and advantages of the present disclosure will be more clearly understood from the following detailed description of the preferred embodiments associated with the accompanying drawings. In the drawings, the same or similar elements are denoted by the same reference numerals even though they are depicted in different drawings. Wherever possible, the same reference numbers will be used throughout the drawings to refer to the same or like parts. Further, the terms "first surface", "second surface", "first", "second", and the like are used to distinguish one element from other elements, but the elements should not be construed to be limited by the terms. Hereinafter, in the description, details of well-known features and techniques may be omitted to avoid unnecessarily obscuring the presented embodiments.

In addition, it should be noted that the terms indicating directions as used herein such as upper, lower, left, right, X-axis, Y-axis, Z-axis, and so on are used for convenience of description only, and it is obvious to those skilled in the art that the terms may change depending on the position of an observer or the stated element.

The terms used in the present specification are merely used to describe particular embodiments, and are not intended to limit the present disclosure. Further, singular expressions include plural expressions unless the context clearly indicates otherwise.

Hereinafter, an embodiment of the present disclosure will be described in detail with reference to the accompanying drawings.

Figure 2:
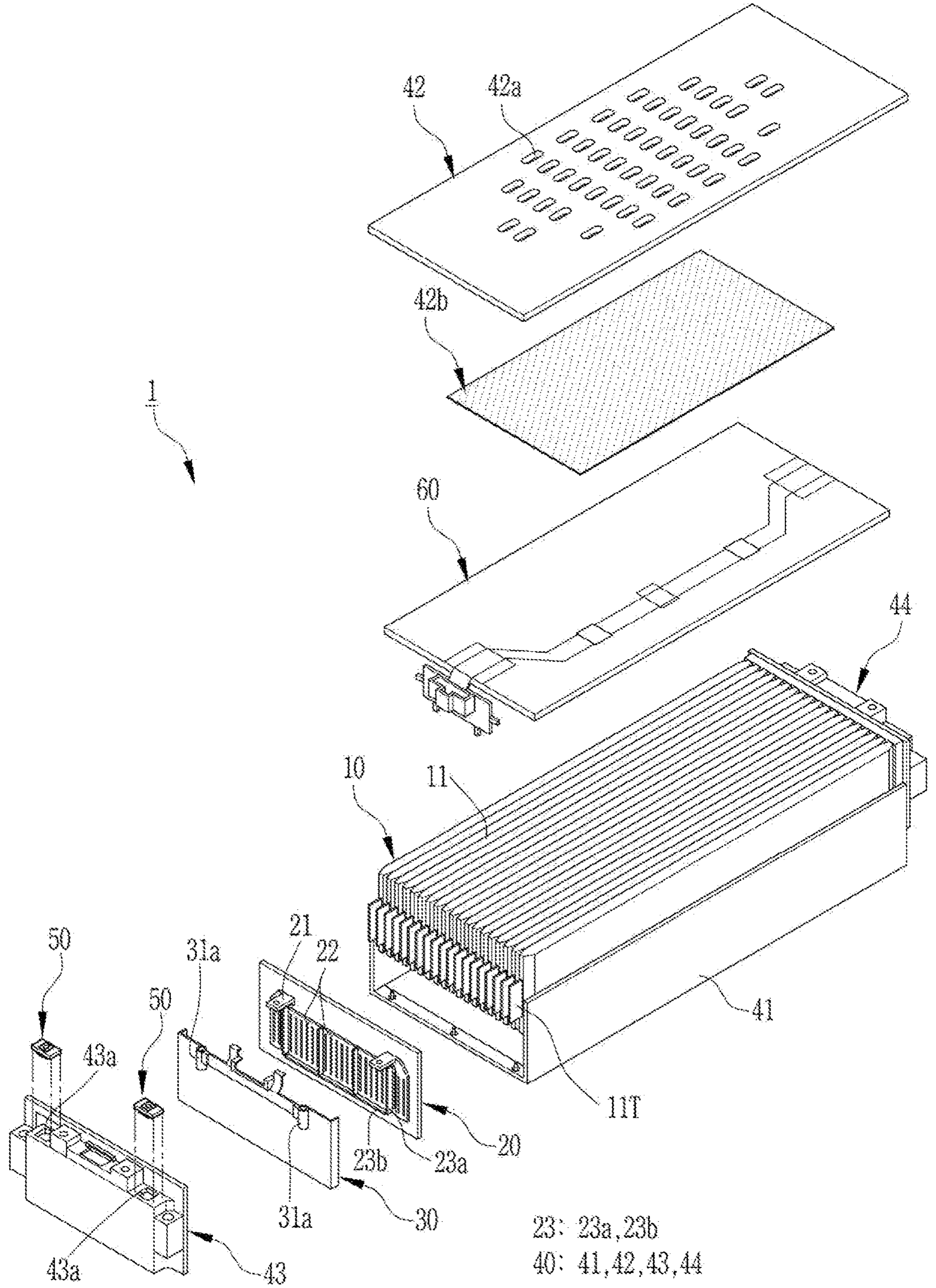
FIG. 2 is an exploded perspective view illustrating the battery module and a flame blocking unit according to an embodiment of the present disclosure.
Figure 3:
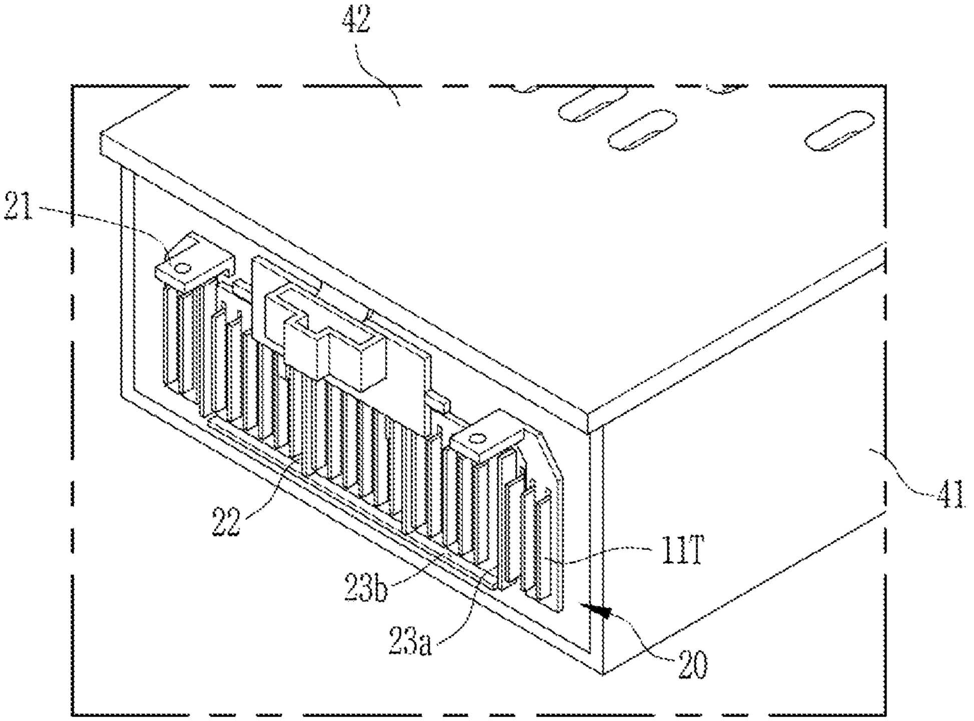
FIG. 3 is a partially enlarged view illustrating a busbar assembly in a state in which cell tabs are inserted.
Figure 4:
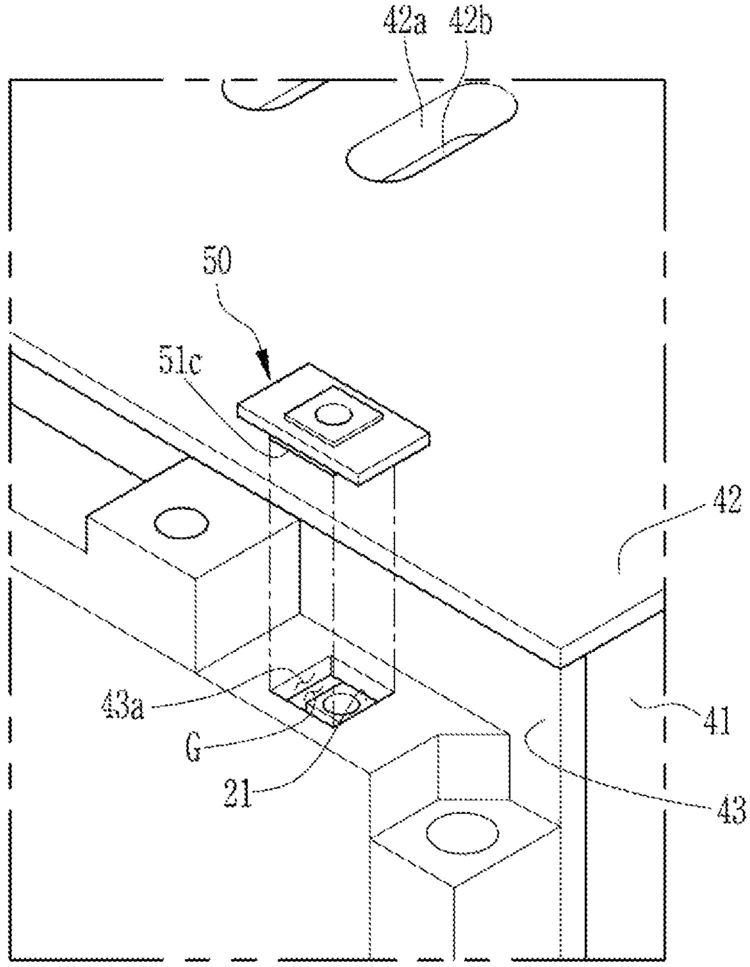
FIG. 4 is a perspective view illustrating a state in which the flame blocking unit and an opening part according to an embodiment of the present disclosure are coupled to each other.
Figure 5:
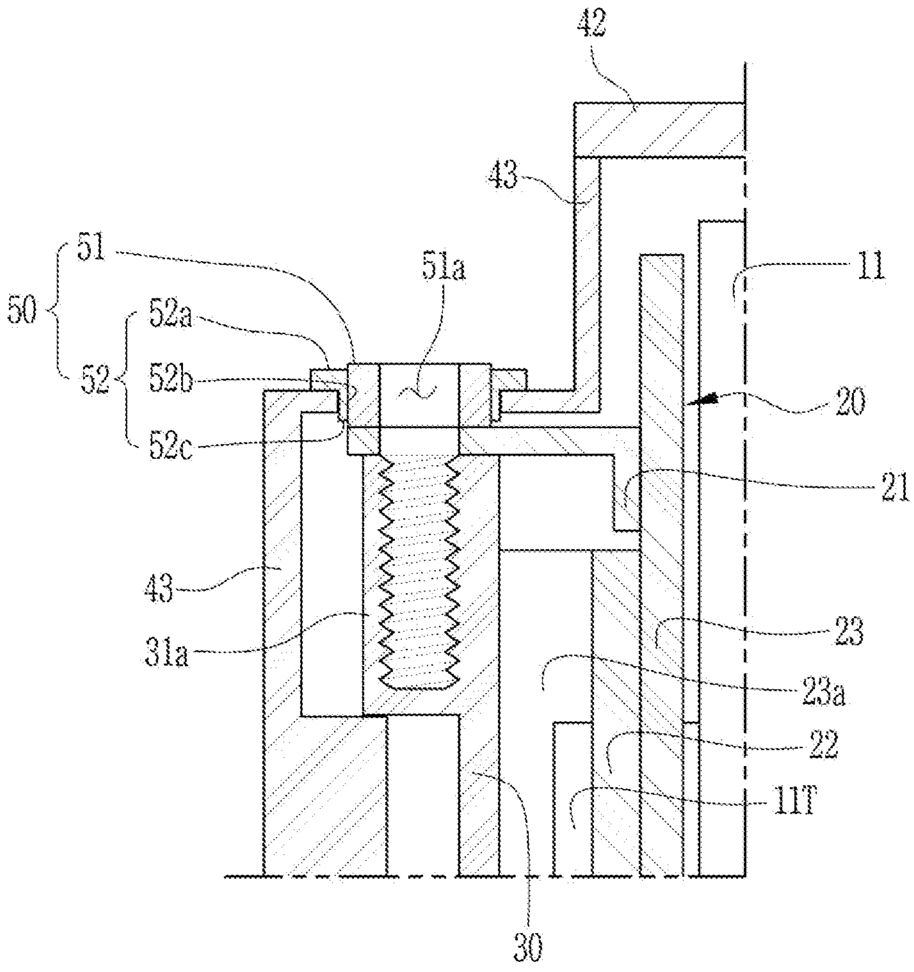
FIG. 5 is a cross-sectional view taken along line A-A' in FIG. 1.

FIG. 1 is a perspective view illustrating a battery module according to an embodiment of the present disclosure. FIG. 2 is an exploded perspective view illustrating the battery module and a flame blocking unit according to an embodiment of the present disclosure. FIG. 3 is a partially enlarged view illustrating a busbar assembly in a state in which cell tabs are inserted. FIG. 4 is a perspective view illustrating a state in which the flame blocking unit and an opening part according to an embodiment of the present disclosure are coupled to each other. FIG. 5 is a cross-sectional view taken along line A-A' in FIG. 1. Hereinafter, the present disclosure will be described with reference to FIGS. 1 to 5.

As illustrated in FIGS. 1 and 2, a battery pack according to an embodiment of the present disclosure may include a battery module 1 in which an internal terminal 21 is exposed at an opening part 43*a,* and may include a flame blocking unit 50 which is connected to the internal terminal 21 via the opening part 43*a* and which transmits electric power of the internal terminal 21 to the outside, the flame blocking unit 50 covering the opening part 43*a* so that a flame generated inside the battery module 1 is prevented from being discharged. Further, the battery module 1 may include a battery assembly 10 including a plurality of battery cells 11, a busbar assembly 20 including the internal terminal 21 which is connected to the battery assembly 10 and which transmits electric power, and a casing 40 which accommodates the battery assembly 10 and the busbar assembly 20 therein and in which the opening part 43*a* is formed.

The battery pack according to an embodiment of the present disclosure is configured such that a flame is blocked or delayed from being emitted through the opening part 43*a* even if a fire occurs inside the battery module 1, thereby preventing a flame from spreading to adjacent battery modules 1.

Hereinafter, the battery module 1 of the battery pack according to an embodiment of the present disclosure will be described.

The battery assembly 10 includes the plurality of battery cells 11. The plurality of battery cells 11 is disposed in a stacked structure, and forms the battery assembly 10. The battery assembly 10 may be electrically connected to the busbar assembly 20 via a plurality of cell tabs 11T exposed to an outside of the plurality of battery cells 11.

The busbar assembly 20 may include the internal terminal 21 capable of being electrically connected to an external electrode, a tab bus 22 into which the plurality of cell tabs 11T having the same polarity is inserted and which electrically connects the cell tabs 11T to each other, and a busbar insulating member 23 which is formed of an electrically insulative material and which prevents a short circuit with other members.

The internal terminal 21 may electrically connect the battery assembly 10 to an external busbar 100. Specifically, the external busbar 100 may be electrically connected to the busbar assembly 20 via the internal terminal 21, and the busbar assembly 20 may be electrically connected to the battery assembly 10. As a result, the battery assembly 10 may be electrically connected to the external busbar 100.

The tab bus 22 may be coupled to the busbar insulating member 23 that will be described later, so that the tab bus 22 may be electrically connected to the plurality of cell tabs 11T having the same polarity. In addition, an insertion part may be formed in the tab bus 22 and the plurality of adjacent cell tabs 11T having the same polarity may be inserted into the insertion part, so that the inserted cell tabs 11T may be electrically connected to each other.

The busbar insulating member 23 may support and fix the internal terminal 21 and the tab bus 22 such that the internal terminal 21 and the tab bus 22 are disposed at a predetermined position inside the battery module 1. In addition, the busbar insulating member 23 may be formed of an electrically insulative material, so that the busbar insulating member 23 may prevent a short circuit that occurs when the internal terminal 21 and the tab bus 22 are in contact with the casing 40 and so on.

In addition, the busbar insulating member 23 may include a first partition wall 23*a* which protrudes from a space between the tab bus 22 and an adjacent tab bus 22 and which vertically partitions the tab bus 22 and the adjacent tab bus 22 from each other, and may include a second partition wall 23*b* which horizontally protrudes from a lower portion of the first partition wall 23*a.* The first partition wall 23*a* and the second partition wall 23*b* may prevent a short circuit that occurs when the cell tab 11T or the tab bus 22 is in contact with the adjacent cell tab 11T or the adjacent tab bus 22 having different polarity while a fire occurs in the battery cell 11. In addition, when various fragments are generated inside the battery cell 11 due to a fire, the first partition wall 23*a* and the second partition wall 23*b* may prevent a short circuit that occurs when the fragments are scattered to the adjacent tab bus 22, the casing 40, and so on.

In addition, as illustrated in FIG. 3, the first partition wall 23*a* and the second partition wall 23*b* may further protrude from the busbar assembly 20 such that the first partition wall 23*a* and the second partition wall 23*b* are in close contact with an insulating part 30. In this situation, gas or a flame generated from the battery cell 11 may be guided to flow to an upper portion of the tab bus 22.

Specifically, when gas or a flame generated from the battery cell 11 flows through the insertion part of the tab bus 22, the first partition wall 23*a* may prevent a venting gas or a flame from flowing toward the other tab bus 22 adjacent to the left and right of the tab bus 22. In addition, the second partition wall 23*b* positioned at the lower portion of the first partition wall 23*a* may prevent gas or a flame from flowing toward a lower portion of the tab bus 22. As a result, the first partition wall 23*a* and the second partition wall 23*b* may guide gas or a flame to flow toward the upper portion of the tab bus 22 by blocking spaces on the left and right sides and the lower portion of the tab bus 22. The gas or the flame that is guided to the upper portion as described above may burst a venting sheet 42*b* that will be described later, and may be discharged to the outside of the battery module 1 through a venting hole 42*a*.

That is, the first partition wall 23*a* and the second partition wall 23*b* may prevent an internal short circuit when a fire occurs inside the battery module 1, and may also appropriately control a flow direction of gas or a flame that is generated inside the battery module 1, thereby being capable of guiding the gas or the flame to a direction toward the venting hole 42*a* of a top cover 42.

The casing 40 may accommodate the battery assembly 10 and the busbar assembly 20 therein, and the opening part 43*a* that exposes the internal terminal 21 may be formed in the casing 40. Specifically, the casing 40 includes a bottom cover 41 which is formed in a 'C' shape and which provides a space in which the battery assembly 10 is seated, a front cover 43 coupled to the bottom cover 41 from a first side of the battery assembly 10 in a longitudinal direction, a back cover 44 coupled to the bottom cover 41 from a second side of the battery assembly 10 in the longitudinal direction, and the top cover 42 coupled to an upper portion of the bottom cover 41 such that the battery assembly 10 is covered.

As illustrated in the drawings, the top cover 42 may include at least one venting hole 42*a* that is formed in a predetermined arrangement, and may include the venting sheet 42*b* that is coupled to a lower surface of the top cover 42.

The venting hole 42*a* may be formed by perforating a portion of the top cover 42 in a thickness direction. The venting hole 42*a* provides a path where a venting gas or a flame generated inside the battery module 1 is emitted to the outside of the battery module 1. In addition, by changing the shape of the venting hole 42*a* or the arrangement structure of the plurality of venting holes 42*a*, a venting direction in the battery module 1 unit may be appropriately adjusted.

Specifically, when the plurality of venting holes 42*a* is arranged such that the plurality of venting holes 42*a* is concentrated on a first side of the battery module 1, gas and the like generated inside the battery module 1 may be vented to only the first side of the battery module 1. As such, by varying the arrangement structure and the arrangement of the venting holes 42*a*, the venting direction in the battery module 1 unit may be appropriately adjusted. In addition, in order for gas generated in the battery cell 11 to be discharged directly, the venting hole 42*a* may be formed in the top cover 42 at a position corresponding to each battery cell 11.

The venting sheet 42*b* is coupled to the lower portion of the top cover 42, and delays a venting gas or a flame inside the battery module 1 from being vented to the venting hole 42*a* positioned above the venting sheet 42*b*. That is, the venting sheet 42*b* is coupled to the lower portion of the top cover 42 such that the venting sheet 42*b* covers a lower portion of the venting hole 42*a*.

When a pressure inside the battery module 1 further increases, a portion in the venting sheet 42*b* corresponding to the venting hole 42*a* may burst. When the venting sheet 42*b* bursts, gas or a flame inside the battery module 1 may be emitted to the outside of the battery module 1 through the venting hole 42*a*.

Specifically, although not illustrated in the drawings, the venting sheet 42*b* may further include a venting line that is formed by cutting a portion of the venting sheet 42*b* in a thickness direction at a position corresponding to the venting hole 42*a*. The venting line may burst when a pressure of gas generated inside the battery module 1 reaches a predetermined pressure, so that the gas generated inside the battery module 1 may be discharged to the upper portion of the battery module 1 through the venting hole 42*a*. The shape of the venting line may be variously modified, such as a straight shape or a zigzag shape. The shape or a cutting thickness of the venting line may be variously modified. Accordingly, the time at which a venting gas or a flame is vented or a tolerable internal pressure of the battery module 1 may be appropriately adjusted.

In addition, a circuit substrate 60 for controlling the battery assembly 10 may further be included between the top cover 42 and the battery assembly 10. The circuit substrate 60 may serve to measure a voltage, a current, or a temperature of the battery assembly 10, or may serve to obtain information and so on for determining whether the battery assembly 10 is overcharged.

In order for mechanical rigidity of the battery module 1, the front cover 43 may be formed of metal material such as aluminum (Al). The front cover 43 formed of metal material is electrically conductive. Therefore, in order to prevent a short circuit with the busbar assembly 20, the insulating part 30 may be disposed between the front cover 43 and the busbar assembly 20.

The insulating part 30 may include a fastening member 31 provided with a fastening groove 31*a*. The fastening member 31 may include a fastener 31*b* and the fastening groove 31*a* that is coupled to the fastener 31*b*. The fastener 31*b* may be a bolt, and the fastening groove 31*a* may be a nut. The fastening groove 31*a* may be formed by performing an insert injection molding or the like on the insulating part 30, so that the fastening groove 31*a* may be formed integrally with the insulating part 30.

In addition, in order for the fastener 31*b* to pass through the internal terminal 21 and to be fastened to the fastening groove 31*a* of the fastening member 31, the fastening groove 31*a* may be positioned below the internal terminal 21.

In FIG. 2, it is illustrated that the fastening groove 31*a* is formed in the insulating part 30, but the position of the fastening groove 31*a* is not particularly limited. Particularly, the position of the fastening groove 31*a* is not particularly limited as long as the fastening member 31 has a structure to be coupled while being in a state in which the external busbar 100, the flame blocking unit 50, and the internal terminal 21 are interposed inside the fastening member 31. That is, the fastening groove 31*a* may be formed in the internal terminal 21, or may be formed integrally with the internal terminal 21 by performing the insert injection molding or the like.

In addition, the opening part 43*a* may be formed in the casing 40 such that the internal terminal 21 is exposed. The opening part 43*a* may be formed in a shape in which a portion of the casing 40 is perforated at a position corresponding to the internal terminal 21. The external busbar 100 may be connected to the internal terminal 21 via the opening part 43*a*, so that the battery module 1 may be electrically connected to the outside.

Specifically, the opening part 43*a* is formed such that the opening part 43*a* exposes the internal terminal 21 at a position corresponding to the internal terminal 21, so that the external busbar 100 is electrically connected to the internal terminal 21 via the exposed space. Therefore, as illustrated in FIG. 1, the opening part 43*a* is formed on the front cover 43 of the casing 40, but is not limited thereto.

In addition, due to an assembly structure of the battery module 1, a gap G may be formed between the opening part 43*a* and the internal terminal 21. At this time, when a fire occurs inside the battery module 1 due to thermal runaway or the like, a flame may be emitted through the opening part 43*a*. The emitted flame may apply a thermal load on adjacent battery modules 1, so that a thermal propagation may occur. When heat is propagated between the plurality of battery modules 1, safety of the plurality of battery modules 1 is reduced.

Specifically, the flame blocking unit 50 seals the gap G between the internal terminal 21 positioned inside the battery module 1 and the opening part 43*a* at which the internal terminal 21 is partially exposed. Therefore, when a fire occurs inside the battery module 1 due to occurrence of thermal runaway, the flame blocking unit 50 blocks a flame from being emitted to the gap G between the internal terminal 21 and the opening part 43*a*.

In order for the safety of the battery module 1, the flame blocking unit 50 is coupled to the opening part 43*a* of the casing 40 such that the gap G between the internal terminal 21 and the opening part 43*a* is sealed or filled.

Figure 6:
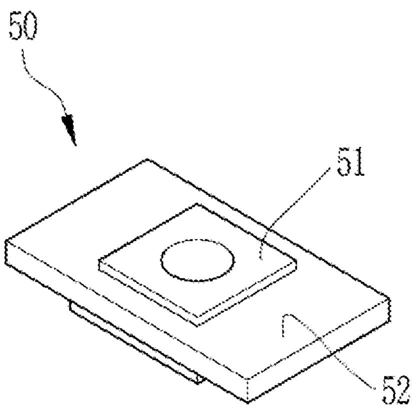
FIG. 6 is a perspective view illustrating the flame blocking unit according to an embodiment of the present disclosure.
Figure 7:
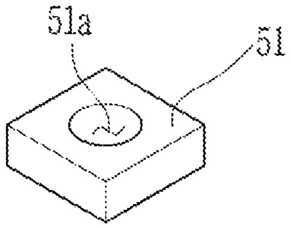
FIG. 7 is a perspective view illustrating an expansion terminal in FIG. 6.
Figure 8:
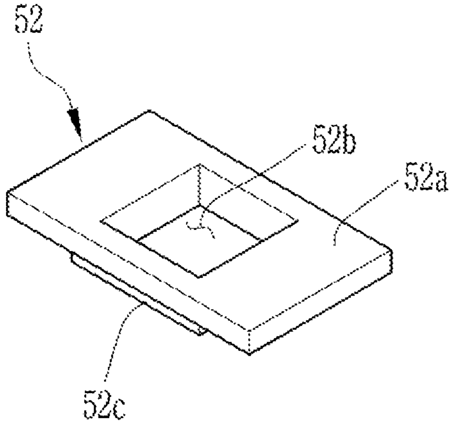
FIG. 8 is a perspective view illustrating a blocking plate in FIG. 6.
Figure 9:
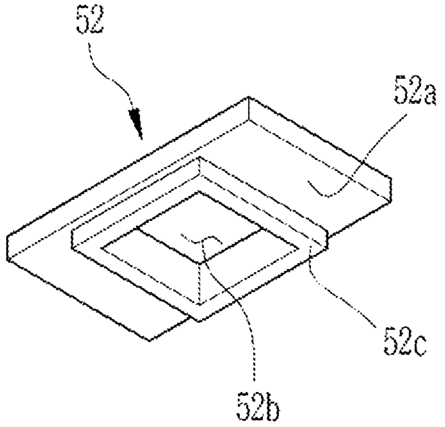
FIG. 9 is a perspective view illustrating the blocking plate in FIG. 8 when viewed from a different angle.

FIG. 6 is a perspective view illustrating the flame blocking unit according to an embodiment of the present disclosure. FIG. 7 is a perspective view illustrating an expansion terminal in FIG. 6. FIG. 8 is a perspective view illustrating a blocking plate in FIG. 6. FIG. 9 is a perspective view illustrating the blocking plate in FIG. 6 when viewed from a different angle. Hereinafter, the present disclosure will be described with reference to FIGS. 6 to 9.

The flame blocking unit 50 according to an embodiment of the present disclosure may include an expansion terminal 51 transmitting electric power by being connected to the internal terminal 21 of the battery module 1 via the opening part 43*a* that is formed in the casing 40 of the battery module 1, and may include a blocking plate 52 that fills a gap between the expansion terminal 51 and the opening part 43*a*.

The flame blocking unit 50 according to an embodiment of the present disclosure may provide an electrical connection to the external busbar 100 by being coupled to the opening part 43*a* of the battery module 1. At the same time, the flame blocking unit 50 may seal the opening part 43*a* so that a flame generated inside the battery module 1 does not emit to the outside of the casing 40.

The expansion terminal 51 is positioned inside the flame blocking unit 50. When the flame blocking unit 50 is coupled to the opening part 43*a*, a first surface of the expansion terminal 51 may be coupled to the internal terminal 21. A second surface of the expansion terminal 51 may be connected to the external busbar 100. The expansion terminal 51 may transmit electricity by being connected between the internal terminal 21 and the external busbar 100.

In order for the expansion terminal 51 to be electrically connected to the internal terminal 21 or the external busbar 100, the expansion terminal 51 is formed of an electrically conductive material. Specifically, the expansion terminal 51 may be formed of metal such as copper (Cu), aluminum (Al), silver (Ag), or the like, or an alloy thereof.

In addition, a thickness of the expansion terminal 51 is not particularly limited as long as the thickness of the expansion terminal 51 is formed such that the expansion terminal 51 is capable of being electrically connected to the internal terminal 21 when the flame blocking unit 50 is coupled to the opening part 43*a*. However, when the thickness of the expansion terminal 51 is thinner than a thickness of the blocking plate 52, the expansion terminal 51 is difficult to be electrically connected to the internal terminal 21 and together with the external busbar 100 when the flame blocking unit 50 is coupled to the opening part 43*a*. Therefore, in order for a stable electrical connection, it is preferable that the thickness of the expansion terminal 51 is formed to be equal to or thicker than the thickness of the blocking plate 52.

In addition, as illustrated in FIG. 4, a through-hole 51*a* through which the fastener 31*b* that connects the internal terminal 21 to the expansion terminal 51 passes may be formed inside the expansion terminal 51. That is, the through-hole 51*a* is formed so that the fastener 31*b* passes through the expansion terminal 51 and the internal terminal 21 and is coupled to the casing 40 of the battery module 1.

A position of the through-hole 51*a* is not particularly limited as long as the through-hole 51*a* is formed to allow the fastener 31*b* to rectilinearly pass through the expansion terminal 51 and the internal terminal 21 when the flame blocking unit 50 is coupled to the opening part 43*a*. At this time, when the fastener 31*b* is a bolt, threads may further be formed on the through-hole 51*a* so as to increase a coupling force with the fastener 31*b*.

The blocking plate 52 is formed so that the blocking plate 52 accommodates the expansion terminal 51 therein and seals the opening part 43*a*. When the flame blocking unit 50 is coupled to the opening part 43*a*, the blocking plate 52 fills the gap G between the internal terminal 21 and the opening part 43*a*. Therefore, when a flame is generated inside the battery module 1, the flame is blocked from being emitted between the gap G.

In order for preventing the expansion terminal 51 from causing a short circuit with the casing 40, it is preferable that the blocking plate 52 is formed of an electrically insulative material such as plastic, rubber, or the like. That is, the blocking plate 52 may serve to seal the gap G between the internal terminal 21 and the opening part 43*a* and, at the same time, may serve to insulate electricity between the expansion terminal 51 and the casing 40.

In addition, the blocking plate 52 may be formed of a high heat resistant material having a volume change within 25% when the high heat resistant material is exposed at a temperature equal to or more than 200° C. for 72 hours. More preferably, the blocking plate 52 may be formed of a high heat resistant material having a volume change within 25% when the high heat resistant material is exposed at a temperature of 250° C. to 350° C. for 72 hours. Here, the volume change refers to a degree of deformation when the high heat resistant material is exposed to heat, and may include both a thermal expansion of the high heat resistant material and a thermal contraction of the high heat resistant material.

Specifically, when the blocking plate 52 is exposed to heat and a volume of the blocking plate 52 expands, the blocking plate 52 receives a pressure and is fractured or deformed, so that the gap G between the internal terminal 21 and the opening part 43*a* may be generated. In addition, when the volume of the blocking plate 52 is contract, the gap G between the internal terminal 21 and the opening part 43*a* may not be fully filled. When the gap G between the internal terminal 21 and the opening part 43*a* is generated due to the thermal deformation of the blocking plate 52 or when the gap G cannot be fully filled, there is a risk that a flame is emitted through the gap G when a flame is generated inside the battery module 1. That is, by limiting a thermal deformation rate of the blocking plate 52, a flame is prevented from being emitted through the gap G between the internal terminal 21 and the opening part 43*a* even if the flame is generated inside the battery module 1 and the flame blocking unit 50 is exposed to the flame for a long time.

In addition, the blocking plate 52 may be formed by performing the insert injection molding such that the blocking plate 52 surrounds an outer circumferential surface of the expansion terminal 51. In this situation, by integrally assembling the blocking plate 52 and the expansion terminal 51, a gap between the blocking plate 52 and the expansion terminal 51 is removed, so that a flame blocking ability of the flame blocking unit 50 may be further increased.

The blocking plate 52 may be formed such that an area of the blocking plate 52 is wider than an area of the opening part 43*a* so that the blocking plate 52 covers the opening part 43*a* of the battery module 1 from an outside of the casing 40. That is, in order for the gap G between the internal terminal 21 and the opening part 43*a* to be sealed by covering the casing 40 from the outside of the casing 40, the area of the blocking plate 52 may be wider than the area of the opening part 43*a*.

The flame blocking unit 50 according to an embodiment of the present disclosure may include a plate part 52*a* which is formed such that an area of the plate part 52*a* is wider than an area of the opening part 43*a* so that the blocking plate 52 covers the casing 40 from the outside of the casing 40, an expansion terminal accommodating part 52*b* which is positioned at a center of the plate part 52*a* and which accommodates the expansion terminal 51 therein, and a fitting part 52*c* which is formed on a surface where the plate part 52 and the casing 40 are in contact with each other and which protrudes to correspond to an inner surface shape of the opening part 43*a*.

By this configuration, the position of the flame blocking unit 50 remains in a fixed state even if vibration or impact is applied to the battery module 1, so that flame blocking reliability of the flame blocking unit 50 may be increased and the flame blocking ability may be maintained.

The plate part 52*a* is formed such that an area of the plate part 52*a* is wider than the area of the opening part 43*a* so that the plate part 52*a* covers the opening part 43*a* from the outside of the casing 40. The meaning of covering the opening part 43*a* is already described, so that a detailed description thereof will be omitted. Since the plate part 52*a* is formed such that the area of the plate part 52*a* is wider than the area of the opening part 43*a* so that the opening part 43*a* is covered, the plate part 52*a* serves to seal the gap G between the internal terminal 21 and the opening part 43*a* when the flame blocking unit 50 is coupled to the opening part 43*a* of the battery module 1. That is, by the plate part 52*a*, a flame generated inside the battery module 1 is restrained from being emitted to the gap G between the internal terminal 21 and the opening part 43*a*. Therefore, the flame may be prevented from propagating to adjacent battery modules 1.

The expansion terminal accommodating part 52*b* is a space accommodating the expansion terminal 51 therein. The expansion terminal accommodating part 52*b* and the expansion terminal 51 may be coupled to each other by various methods such as a fit coupling and so on. However, preferably, the expansion terminal 51 and the expansion terminal accommodating part 52*b* may be coupled to each other by a rib that protrudes on the outer circumferential surface of the expansion terminal 51 and by a rib groove which is formed in an inner circumferential surface of the expansion terminal accommodating part 52*b* and in which the rib is accommodated. Otherwise, preferably, by integrally forming the blocking plate 52 around the expansion terminal accommodating part 52*b* by performing the insert injection molding and soon, integrity of the coupling of the expansion terminal 51 and the blocking plate 52 may be increased and the gap between the expansion terminal 51 and the blocking plate 52 may be sealed.

The fitting part 52*c* is formed on the surface where the plate part 52*a* and the casing 40 are in contact with each other. That is, the fitting part 52*c* protrudes such that the fitting part 52*c* corresponds to the inner surface shape of the opening part 43*a*, and protrudes from the plate part 52*a* toward the gap G between the internal terminal 21 and the opening part 43*a*, thereby being formed so that the fitting part 52*c* seals the space between the expansion terminal 51 and the opening part 43*a* and is fitted into the space.

Unlike the plate part 52*a* that is formed in a shape which covers the gap G between the internal terminal 21 and the opening part 43*a* from the outside of the casing 40 and from the outside the opening part 43*a*, the fitting part 52*c* may directly seal the gap between the expansion terminal 51 and the opening part 43*a* by being directly coupled to the gap G between the internal terminal 21 and the opening part 43*a* from an inside of the casing 40.

In addition, as illustrated in FIG. 5, the fitting part 52*c* is formed in a shape that rectilinearly extends downward from the plate part 52*a*. However, the shape is not limited thereto, and any shape may be applied as long as the shape corresponds to the gap between the expansion terminal 51 and the opening part 43*a*.

Since the fitting part 52*c* is formed such that the shape of the fitting part 52*c* corresponds to the shape of the opening part 43*a*, sealing ability of the blocking plate 52 may be increased, so that the flame blocking ability of the flame blocking unit 50 may be increased. In addition, ease of assembling when the flame blocking unit 50 is disposed to the opening part 43*a* may be increased.

In addition, when the opening part 43*a* is formed in a rib shape, the fitting part 52*c* is formed in a rib shape corresponding to the rib shape of the opening part 43*a*, so that the gap G between the internal terminal 21 and the opening part 43*a* may be more rigidly sealed.

In addition, since the fitting part 52*c* is fitted into the gap G between the internal terminal 21 and the opening part 43*a*, the fitting part 52*c* is positioned in a rigidly fitted state even if vibration or impact is applied to the flame blocking unit 50, so that the gap which is generated between the expansion terminal 51 and the opening part 43*a* when the flame blocking unit 50 is rotated or moved is prevented from being generated.

Figure 10:
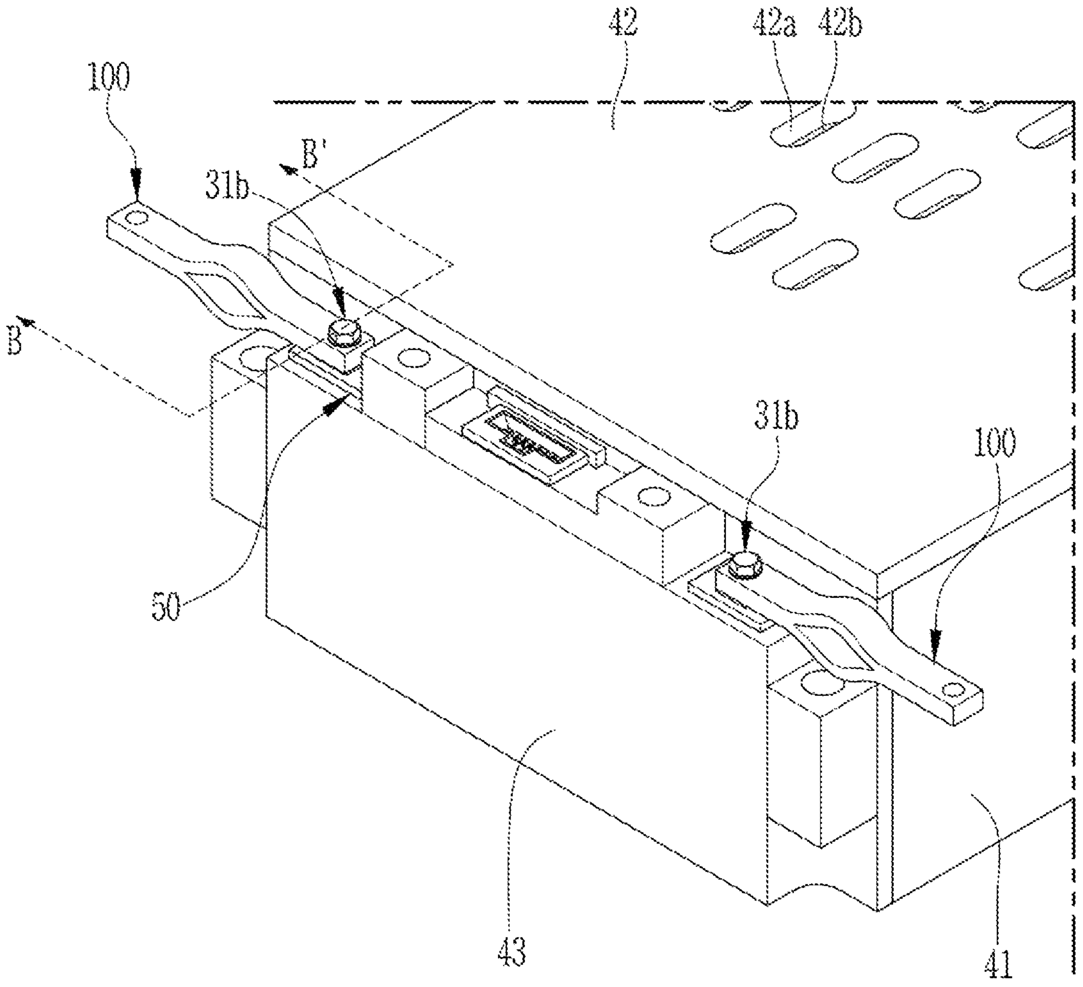
FIG. 10 is a perspective view illustrating a state in which external busbars are coupled to the battery module according to an embodiment of the present disclosure.
Figure 11:
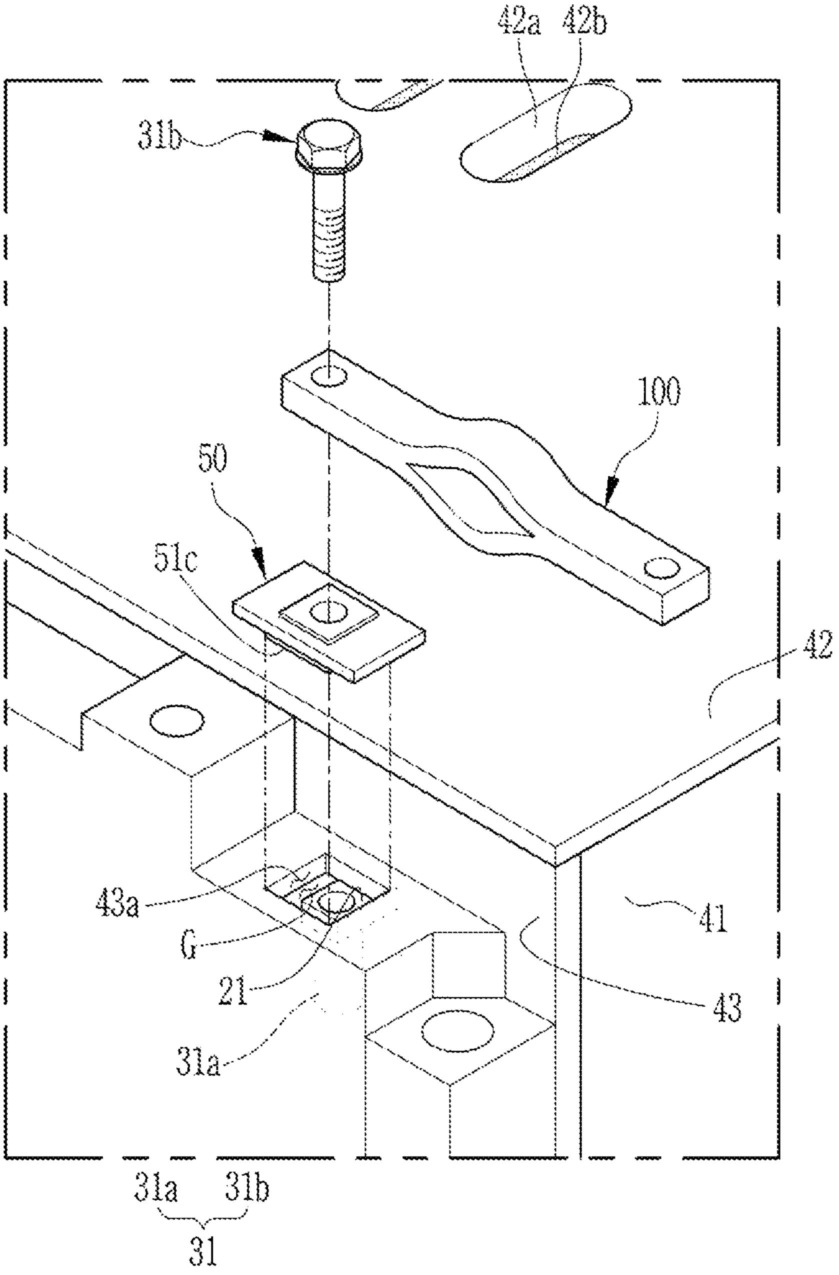
FIG. 11 is a view illustrating a state in which the flame blocking unit and a fastener according to an embodiment of the present disclosure are coupled to each other.
Figure 12:
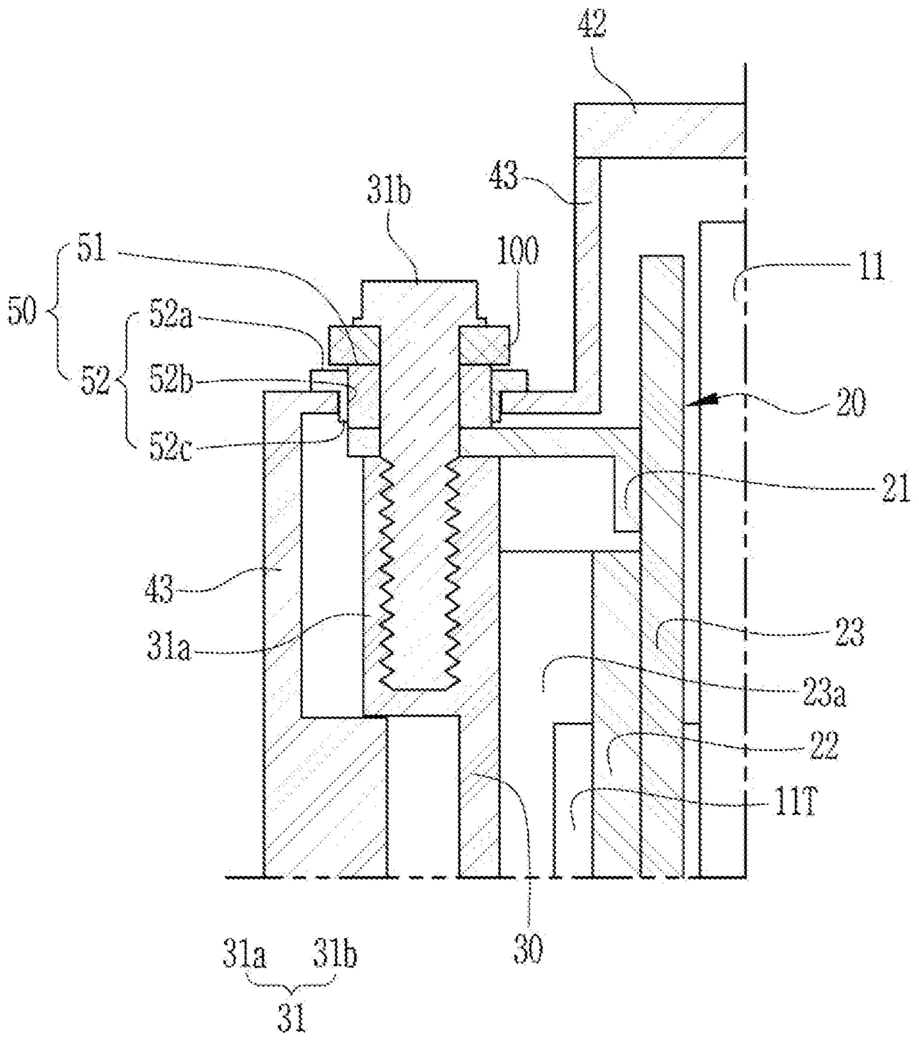
FIG. 12 is a cross-sectional view taken along line B-B' in FIG. 10.
Figure 13:
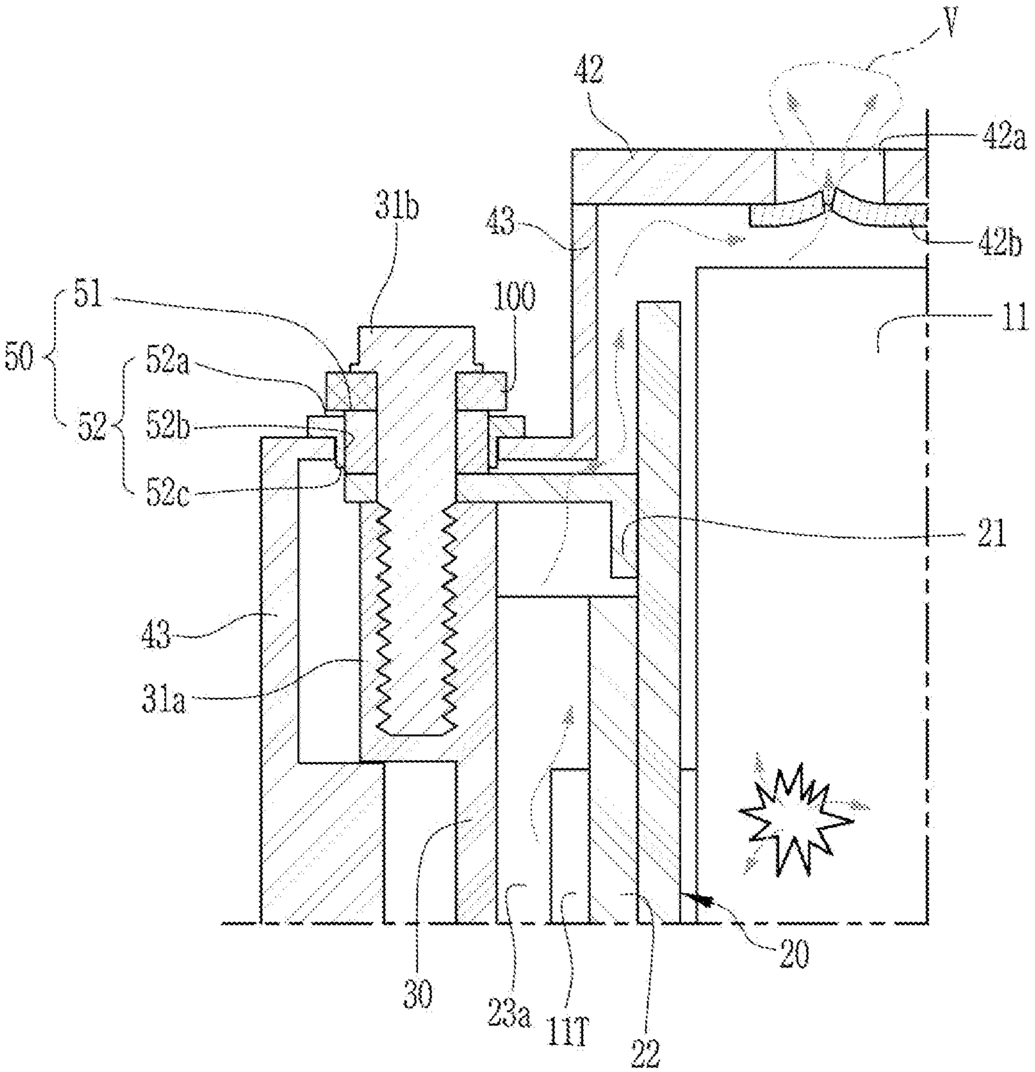
FIG. 13 is a view illustrating a state in which gas or a flame is discharged through a venting hole from inside the battery module.

FIG. 10 is a perspective view illustrating a state in which external busbars are coupled to the battery module 1 according to an embodiment of the present disclosure. FIG. 11 is a view illustrating a state in which the flame blocking unit and a fastener according to an embodiment of the present disclosure are coupled to each other. FIG. 12 is a cross-sectional view taken along line B-B' in FIG. 10. FIG. 13 is a view illustrating a state in which gas or flame is discharged through a venting hole from inside the battery module 1. Hereinafter, the present disclosure will be described with reference to FIGS. 10 to 13.

The blocking plate 52 is in close contact with the opening part 43*a* by a force that couples the fastener 31*b* to the casing 40, so that the gap G between the internal terminal 21 and the opening part 43*a* is sealed while being in a pressed state.

Specifically, the fastener 31*b* may be coupled to the fastening groove 31*a* by passing through the external busbar 100, the flame blocking unit 50, and the internal terminal 21 in order. By the force applied by the fastener 31*b* in a direction toward the fastening groove 31*a*, the flame blocking unit 50 may be in close contact with the opening part 43*a*. That is, the fastener 31*b* applies a pressure to the flame blocking unit 50 in the thickness direction in which the flame blocking unit 50 and the internal terminal 21 are stacked.

As a result, even if an internal pressure of the casing 40 is increased due to the occurrence of a fire inside the battery module 1, the fastener 31*b* provides a pressure to the flame blocking unit 50, in which the pressure is higher than the pressure generated inside the casing 40. Therefore, flame blocking effect of the flame blocking unit 50 may be increased and the flame blocking unit 50 may not be separated from the casing 40, so that the flame blocking ability may be stably realized.

In addition, as illustrated in FIG. 13, by the flame blocking unit 50, gas or flame generated from the battery cell 11 is prevented from flowing to the gap G between the internal terminal 21 and the opening part 43*a*. Gas or flame that is not vented into the gap G between the internal terminal 21 and the opening part 43*a* may be guided to a direction toward the top cover 42 and may burst the venting sheet 42*b*, and may be discharged to the upper portion of the battery module 1 through the venting hole 42*a* of the top cover 42 finally.

Meanwhile, the fastener 31*b* is not particularly limited as long as the fastener 31*b* is coupled to the casing 40 of the battery module 1 by passing through the through-hole 51*a* of the blocking plate 52 and the internal terminal 21, and the fastener 31*b* may be a bolt.

Although the embodiments of the present disclosure have been disclosed for illustrative purposes, it will be appreciated that the present disclosure is not limited thereto, and those skilled in the art will appreciate that various modifications, additions and substitutions are possible, without departing from the scope and spirit of the present disclosure. Further, simple changes and modifications of the present disclosure are appreciated as included in the scope and spirit of the present disclosure, and the protection scope of the present disclosure will be defined by the claims.

What is claimed is:

1. A flame blocking unit comprising:

an expansion terminal which is connected to an internal terminal of a battery module via an opening part that is formed in a casing of the battery module and which transmits electric power of the internal terminal to an outside; and a blocking plate filling a gap between the expansion terminal and the opening part and surrounding an outer circumferential surface of the expansion terminal, wherein the blocking plate is formed of an electrically insulative material, wherein the casing is formed of an electrically conductive material, wherein the expansion terminal is provided with a through-hole through which a fastener when connecting the internal terminal to the expansion terminal passes, and the blocking plate is in close contact with the opening part of the casing by a force that couples the fastener to a fastener groove, wherein the fastener groove is formed on an insulating part in the casing, and wherein the thickness of the expansion terminal is formed to be equal to or thicker than the thickness of the blocking plate so that upper side of the expansion terminal is coupled to the outside and lower side of the expansion terminal is coupled to the internal terminal.

2. The flame blocking unit of claim 1, wherein the blocking plate is formed by performing an insert injection molding and is formed of a high heat resistant material having a volume change within 25% when the high heat resistant material is exposed at a temperature equal to or more than 200° C. for 72 hours.

3. The flame blocking unit of claim 1, wherein the blocking plate is formed such that an area of the blocking plate is larger than an area of the opening part so that the blocking plate covers the opening part from an outside of the casing.

4. The flame blocking unit of claim 1, wherein the blocking plate comprises:

a plate part formed such that an area of the plate part is larger than an area of the opening part so that the blocking plate covers the opening part from an outside of the casing;

an expansion terminal accommodating part which is positioned at a center of the plate part and which is formed in a hole shape that accommodates the expansion terminal therein; and a fitting part which is formed on a surface where the plate part and the casing are in contact with each other and which protrudes such that the fitting part corresponds to an inner surface shape of the opening part.

5. A battery pack comprising:

a battery module in which an internal terminal is exposed at an opening part; and a flame blocking unit connected to the internal terminal via the opening part and covering the opening part so that a flame generated inside the battery module is prevented from being discharged, wherein the flame blocking unit comprises:

an expansion terminal which is connected to the internal terminal via the opening part and which transmits electric power of the internal terminal to an outside; and a blocking plate filling a gap between the expansion terminal and the opening part and surrounding an outer circumferential surface of the expansion terminal, wherein the battery module comprises:

a battery assembly comprising a plurality of battery cells;

a busbar assembly comprising the internal terminal which is connected to the battery assembly and which transmits electric power;

a casing which accommodates the battery assembly and the busbar assembly therein and in which the opening part is formed;

an insulating part disposed between the casing and the busbar assembly and having a fastener groove formed thereon; and a fastener which is coupled to the fastener groove and which connects the internal terminal to the expansion terminal, wherein the blocking plate is formed of an electrically insulative material, wherein the casing is formed of an electrically conductive material, wherein through-holes through which the fastener passes are respectively formed in the internal terminal and the expansion terminal, wherein the fastener is coupled to the fastener groove by passing through the through-holes of the internal terminal and the expansion terminal, and the blocking plate is in close contact with the opening part of the casing by a force that couples the fastener to the fastener groove, and wherein the thickness of the expansion terminal is formed to be equal to or thicker than the thickness of the blocking plate so that upper side of the expansion terminal is coupled to the outside and lower side of the expansion terminal is coupled to the internal terminal.

6. The battery pack of claim 5, wherein the blocking plate is formed by performing an insert injection molding and is formed of a high heat resistant material having a volume change within 25% when the high heat resistant material is exposed at a temperature equal to or more than 200° C for 72 hours.

7. The battery pack of claim 5, wherein the blocking plate is formed such that an area of the blocking plate is larger than an area of the opening part so that the blocking plate covers the opening part from an outside of the casing.

8. The battery pack of claim 5, wherein the blocking plate comprises:

a plate part formed such that an area of the plate part is larger than an area of the opening part so that the blocking plate covers the opening part from an outside of the casing;

an expansion terminal accommodating part which is positioned at a center of the plate part and which is formed in a hole shape that accommodates the expansion terminal therein; and a fitting part which is formed on a surface where the plate part and the casing are in contact with each other and which protrudes such that the fitting part corresponds to an inner surface shape of the opening part.

9. The battery pack of claim 5, further comprising an external busbar which is connected to an external electrode and in which a through-hole where the fastener passes therethrough is formed, wherein the fastener is coupled to the casing by passing through the through-holes of the external busbar, the internal terminal, and the expansion terminal.

10. The battery pack of claim 5, wherein the busbar assembly further comprises:

a tab bus into which cell tabs having the same polarity are inserted and which electrically connects the inserted cell tabs to each other; and an insulating member which is formed of the electrically insulative material and which supports and fixes the internal terminal and the tab bus, wherein the insulating member is provided with a first partition wall which protrudes from a space between the tab bus and an adjacent tab bus and which vertically partitions the tab bus and the adjacent tab bus from each other.

11. The battery pack of claim 10, wherein the insulating member further comprises a second partition wall which horizontally protrudes from a lower portion of the first partition wall.

12. The battery pack of claim 11, wherein the casing comprises a front cover coupled to the casing from a first side of the battery assembly in a longitudinal direction, the insulating part which is disposed between the front cover and the busbar assembly and which is formed of the electrically insulative material, and the first partition wall and the second partition wall protrude such that the first partition wall and the second partition wall are in close contact with the insulating part.

13. The battery pack of claim 5, wherein the casing comprises a top cover coupled to the casing from an upper portion of the casing such that the battery assembly is covered, and at least one venting hole is formed in the top cover such that gas or a flame generated inside the battery module is vented to the outside through an upper portion of the battery module.

14. The battery pack of claim 13, wherein the top cover further comprises a venting sheet coupled to a lower portion of the top cover such that a lower portion of the venting hole is covered, and the venting sheet is provided with a venting line which is formed in a portion corresponding to the venting hole so that the portion corresponding to the venting hole bursts when a pressure of gas generated inside the battery module reaches a predetermined pressure.

* * * * *